(12) United States Patent
Woltmann

(10) Patent No.: US 6,431,118 B1
(45) Date of Patent: Aug. 13, 2002

(54) APPARATUS AND METHOD FOR PROVIDING HUMIDIFIED AIR TO A TERRARIUM

(75) Inventor: Klaus W. Woltmann, Demarest, NJ (US)

(73) Assignee: Imagine Gold, L.L.C., South Hackensack, NJ (US)

( * ) Notice: Subject to any disclaimer, the term of this patent is extended or adjusted under 35 U.S.C. 154(b) by 0 days.

(21) Appl. No.: 09/861,964

(22) Filed: May 21, 2001

(51) Int. Cl.[7] ............................................... A01K 63/00
(52) U.S. Cl. ..................... 119/246; 261/121.1; 261/153
(58) Field of Search ................................. 119/246, 452, 119/448, 416, 417, 418; 261/121.1, 122.1, 124, 153

(56) References Cited

U.S. PATENT DOCUMENTS

| | | | |
|---|---|---|---|
| 1,096,533 A | | 5/1914 | Holmes |
| 1,854,774 A | | 4/1932 | Wells et al. |
| 1,889,137 A | | 11/1932 | White |
| 2,031,164 A | | 2/1936 | Johnson |
| 2,731,250 A | | 1/1956 | Yon |
| 3,257,995 A | | 6/1966 | Schnabel |
| 3,332,672 A | * | 7/1967 | Schipper |
| 3,982,095 A | * | 9/1976 | Robinson ..................... 219/273 |
| 4,618,462 A | * | 10/1986 | Fisher ........................ 261/130 |
| 4,632,789 A | * | 12/1986 | Reid ............................ 261/63 |
| 4,754,571 A | * | 7/1988 | Riechmann ................... 47/59 |
| 4,759,882 A | * | 7/1988 | Reid ........................... 261/16 |
| 5,010,845 A | | 4/1991 | Azpurua et al. |
| 5,799,614 A | | 9/1998 | Greenwood |
| 6,006,471 A | * | 12/1999 | Sun .............................. 47/69 |

* cited by examiner

Primary Examiner—Peter M. Poon
Assistant Examiner—Kevin Jakel
(74) Attorney, Agent, or Firm—Arthur Jacob

(57) ABSTRACT

Apparatus and method for supplying humidified air to a terrarium include providing a chamber within which there is placed a reservoir of water and a humidifying member having a humidifying surface located adjacent the surface of the water in the reservoir so that air released below the surface of the water in the reservoir rises through the reservoir of water to burst from the surface of the water and thereby drive water droplets to the humidifying surface of the so as to wet the humidifying surface and expose air in the chamber to the wetted humidifying surface. The air thus exposed is humidified by exposure to the wetted humidifying surface, and the humidified air is delivered to the terrarium. The humidifying surface includes a reticulated configuration providing the humidifying surface with an extended surface area for enhanced humidification.

18 Claims, 4 Drawing Sheets

APPARATUS AND METHOD FOR PROVIDING HUMIDIFIED AIR TO A TERRARIUM

The present invention relates generally to terrariums and pertains, more specifically, to apparatus and method for providing terrariums with humidified air.

Terrariums are becoming more prevalent in both domestic and commercial settings where it is desired to display unique and ever-changing scenes in which various live creatures are shown in a simulated natural habitat. In order to maintain a healthy, viable community in a terrarium, it is necessary to provide the terrarium with an adequate supply of fresh air having an appropriate temperature and humidity. Most terrariums usually require a regulated air humidity which is higher than the humidity of the ambient air outside the terrarium. Humidifiers have been made available for terrariums; however, currently available terrarium humidifiers are relatively complex and expensive, and do not always function to provide a terrarium with fresh air at an appropriate level of humidity.

The present invention provides simple and effective apparatus and method for supplying a terrarium with humidified air, in accordance with the requirements of the particular terrarium. As such, the present invention attains several objects and advantages, some of which are summarized as follows: Provides apparatus and method for the effective supply of humidified air to a terrarium, with increased simplicity and effectiveness; enables the continuous provision of fresh, appropriately humidified air to a terrarium; allows increased ease of installation and operation in maintaining optimum humidity in a terrarium; provides quiet and dependable apparatus and method for assuring a supply of fresh, appropriately humidified air for terrariums; provides a relatively simple and inexpensive apparatus, capable of economical manufacture and use, for supplying humidified air to a terrarium; provides a rugged apparatus constructed of relatively few, easily crafted component parts capable of exemplary performance over an extended service life.

The above objects and advantages, as well as further objects and advantages, are attained by the present invention which may be described briefly as apparatus for providing humidified air to a terrarium, the apparatus comprising: a container having a chamber for containing a reservoir of water having a water surface placed at a water level within the chamber, and an air space in the chamber above the water level; an air inlet located below the level of the water surface; an inlet conduit for conducting air to the air inlet so as to release air into the reservoir of water below the water level of the water surface and allow the released air to pass through the reservoir of water and burst through the water surface into the air space in the chamber; a humidifying member extending within the air space in the chamber, adjacent the water level of the water surface, the humidifying member having a humidifying surface exposed for being wetted by water driven from the reservoir and into the air space by the air bursting through the water surface; an air outlet communicating with the air space, above the water level of the water surface, for receiving air passed through the reservoir and humidified by water on the humidifying surface wetted by the water driven from the reservoir; and an outlet conduit communicating with the air outlet for conducting humidified air from the air outlet to the terrarium.

Additionally, the present invention includes a method for providing humidified air to a terrarium, the apparatus comprising: providing a chamber for containing a reservoir of water having a water surface placed at a water level within the chamber, and an air space in the chamber above the water level; conducting air to the reservoir of water so as to release air into the reservoir below the water level of the water surface and allow the released air to pass through the reservoir of water and burst through the water surface into the air space in the chamber, thereby driving water from the reservoir into the air space; providing a humidifying surface within the air space in the chamber, adjacent the water level of the water surface, and wetting the humidifying surface with water driven from the reservoir and into the air space by the air bursting through the water surface; exposing the air passed through the reservoir and into the air space to the wetted humidifying surface so as to be humidified by water on the humidifying surface wetted by the water driven from the reservoir; and conducting humidified air from the air space to the terrarium.

The invention will be understood more fully, while still further objects and advantages will become apparent, in the following detailed description of preferred embodiments of the invention illustrated in the accompanying drawing, in which.

Figure 1:
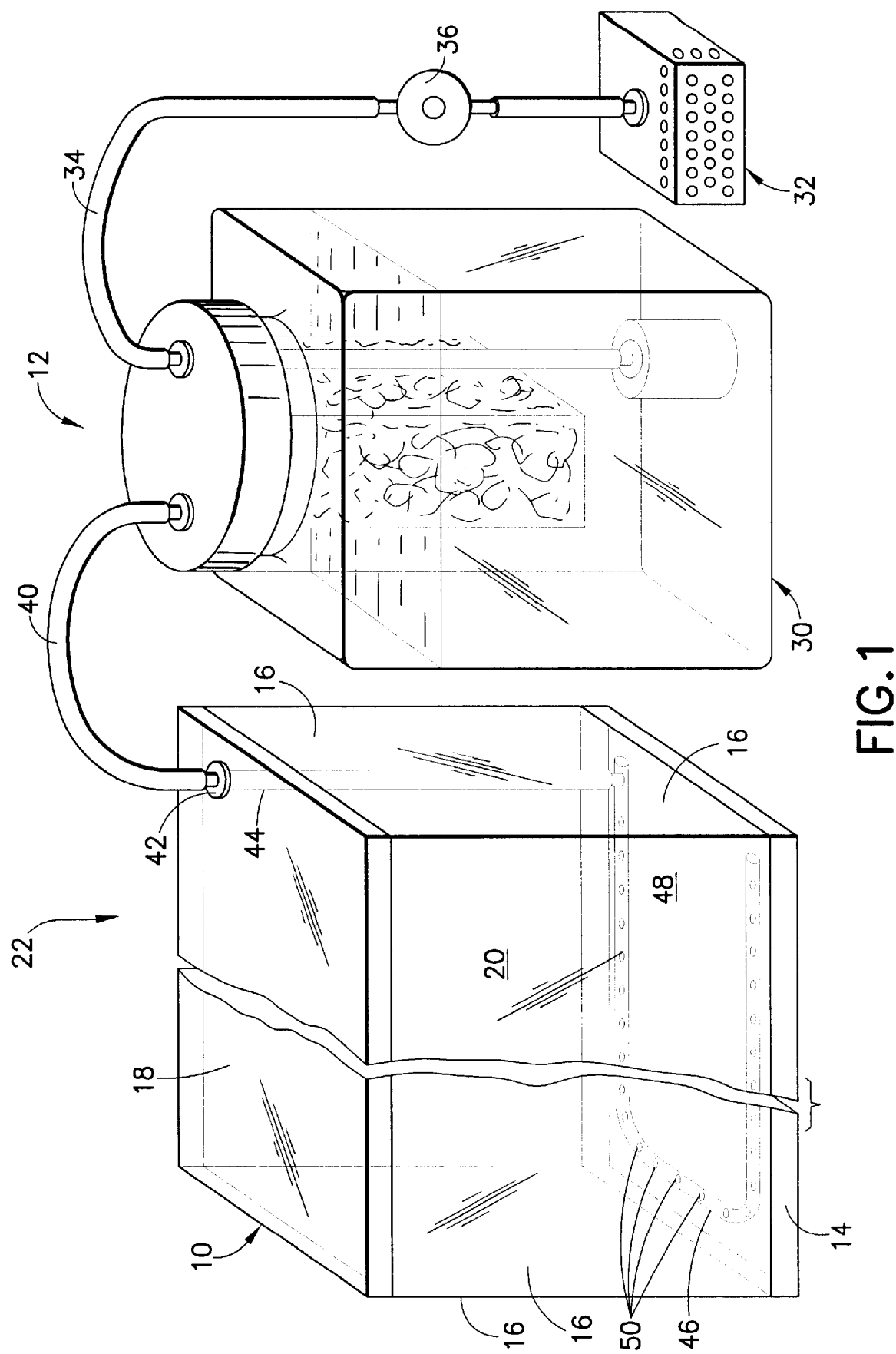
FIG. 1 is a diagrammatic pictorial perspective view of an installation utilizing apparatus and method in accordance with the present invention.

Referring now to the drawing, and especially to FIG. 1 thereof, a terrarium 10 of a type commonly available is to be provided with humidified air by an apparatus 12 constructed in accordance with the present invention. Terrarium 10 includes a base 14, transparent peripheral walls 16, and a cover 18, all of which establish an essentially enclosed environment 20 within the terrarium 10 for live creatures (not shown) to be displayed in the terrarium 10, living in a simulated natural habitat provided by the environment 20. The enclosed environment 20 is essentially isolated from the ambient conditions prevailing at the site 22 of the terrarium 10, and the environment 20 within the terrarium 10 is maintained as nearly as possible at optimum conditions, as prescribed by the needs of the creatures living in the terrarium 10.

Among the conditions within the environment 20 which are to be maintained at an optimum level are an adequate supply of fresh air and a prescribed amount of humidity. The apparatus and method of the present invention fulfill that requirement. Thus, apparatus 12 includes a humidifying unit 30 which receives a supply of fresh air from an air pump 32 communicating with the humidifying unit 30 through an input conduit 34. An airflow valve 36 selectively regulates the volume of air delivered to the humidifying unit 30. The humidifying unit 30 humidifies the air delivered to the humidifying unit 30 and then passes the humidified air to the environment 20 within the terrarium 10 through an output conduit 40 connected to a cover fitting 42 which, in turn, is connected to an air supply tube 44 connected to a distributor in the form of a manifold 46 placed adjacent the bottom 48 of the interior of the terrarium 10, the manifold 46 having distribution holes 50 for distributing the fresh, humidified air to the environment 20 within the terrarium 10.

Figure 2:
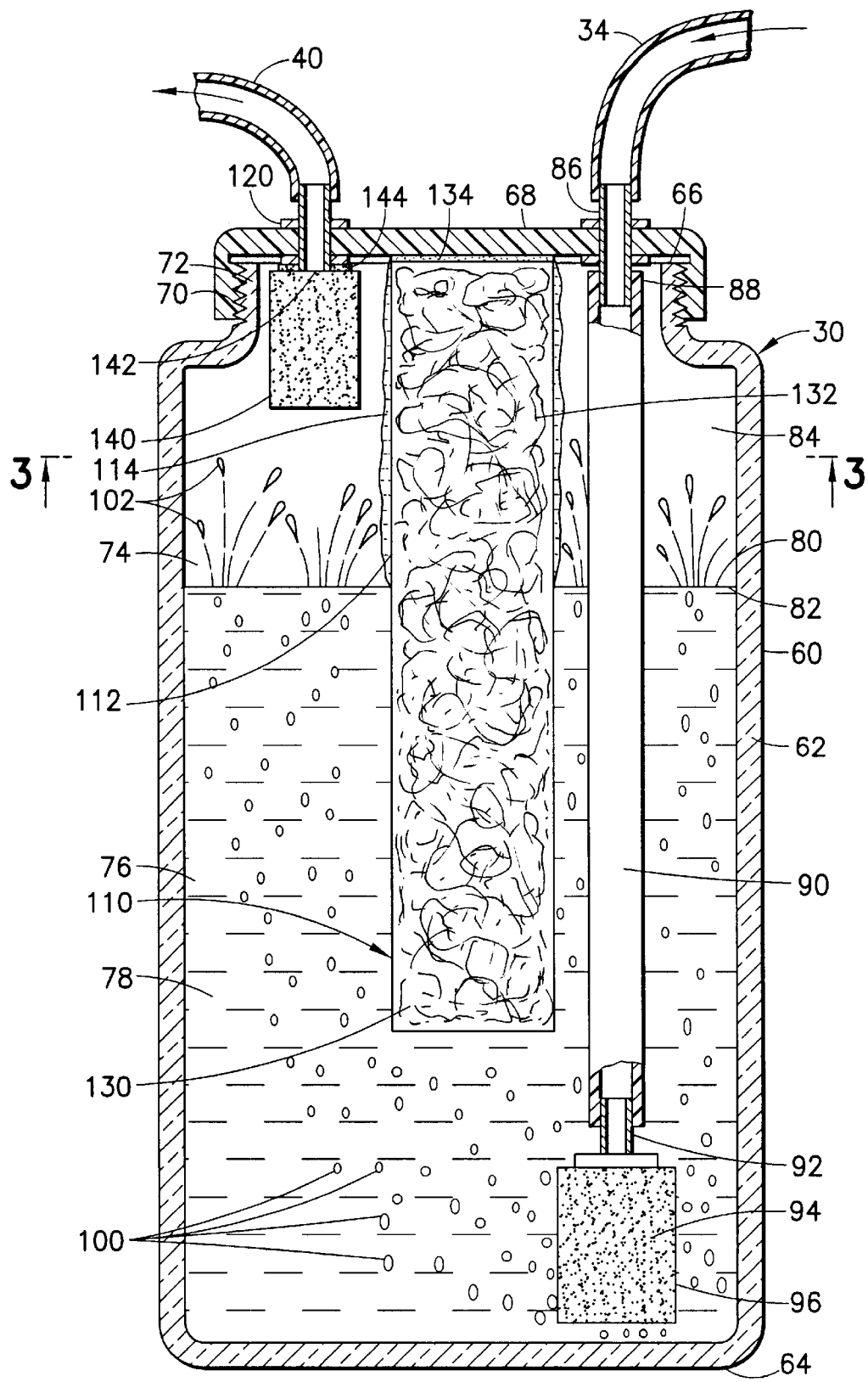
FIG. 2 is an enlarged altitudinal cross-sectional view of an apparatus constructed in accordance with the present invention.
Figure 3:
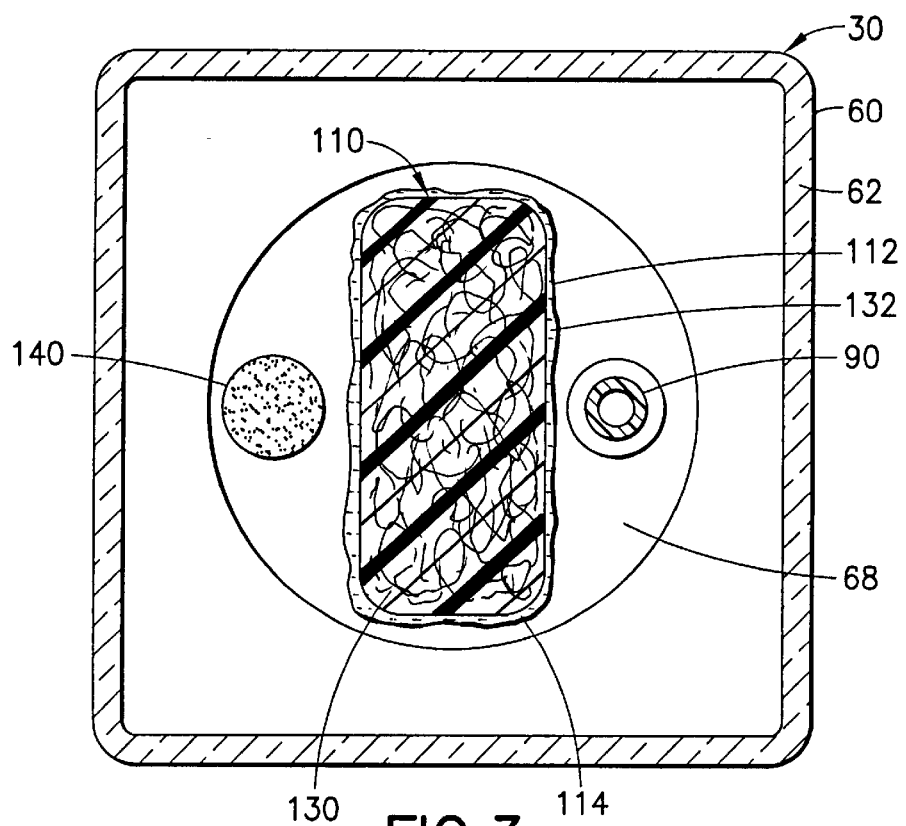
FIG. 3 is a transverse cross-sectional view taken along line 3—3 of FIG. 2.

Turning now to FIGS. 2 and 3, humidifying unit 30 is seen to include a container 60 having a container wall 62 extending altitudinally between a container bottom 64 and a container top 66. A cap 68 closes the top 66 of the container 60, preferably by means of a threaded coupling 70 between the cap 68 and a neck 72 at the top 66 of the container 60. A chamber 74 within the container 60 provides a reservoir 76 for water 78 placed within the container 60. Water 78 includes a water surface 80 placed at a water level 82 spaced altitudinally downwardly from the top 66 of the container 60 so as to establish an air space 84 in the chamber 74, above the water surface 80. Container wall 62 advantageously is transparent to enable a visual determination as to when reservoir 76 is to be replenished with water 78. Replenishment is accomplished, as necessary, by selectively removing cap 68 and adding water to reservoir 76, through neck 72.

An inlet fitting 86 mounted in cap 68 is connected to input conduit 34, outside of container 60, and is connected inside of container 60 to the proximal end 88 of an internal air tube 90. Internal air tube 90 extends altitudinally downwardly from cap 68, toward bottom 64 of the container 60, to a distal end 92 located well below the water surface 80, thereby extending an inlet conduit from the input conduit 34 to an air outlet 94 at the distal end 92. Ambient air is supplied by air pump 32, through airflow valve 36, to the inlet fitting 86, and thence to the distal end 92 of air tube 90 where the air is released into the water 78 in reservoir 76, at the air inlet 94 adjacent the bottom 64 of the container 60. In the preferred construction, air inlet 94 includes a diffuser 96 communicating with the air tube 90 so that the air is released through the diffuser 96 in the form of a multiplicity of air bubbles 100 which are distributed within the reservoir 76 of water 78 and rise through the reservoir 76 of water 78 to burst through the water surface 80, forming water droplets 102 driven into the air space 84 in chamber 74 by the force of the bursting bubbles 100. Diffuser 96 preferably is constructed of a porous ceramic material.

A humidifying member 110 extends altitudinally downwardly from the cap 68 toward and, in the illustrated embodiment, into the reservoir 76 of water 78 in the chamber 74, and presents an external humidifying surface 112 extending within the air space 84 adjacent the water surface 80 at the water level 82. Driven water droplets 102 are deposited on the humidifying surface 112 of the humidifying member 110, in a spray induced by the air bubbles 100 bursting through the water surface 80, and wet the surface 112. The air in air space 84 is exposed to the wetted surface 112 and is humidified by water 114 accumulated on the wetted surface 112. Humidified air then is carried to an air outlet in the form of an outlet fitting 120 mounted in cap 68 and is passed to the output conduit 40, connected to the outlet fitting 120 outside cap 68, for delivery to the terrarium 10, as set forth above.

In the preferred construction, humidifying member 110 comprises a block 130 of reticulated material, such as a reticulated foam synthetic polymeric material, so that humidifying surface 112 is provided with an extended surface area 132, by virtue of the reticulated structure, to expose the air in air space 84 of chamber 74 to an extended area of wetted surface for enhancing humidification of the air as the air travels from reservoir 76, through air space 84, to outlet fitting 120. A preferred material for humidifying member 110 is a reticulated foam polyurethane, commonly referred to as "fish foam", and having about twenty to twenty-five pores per inch. Block 130 is affixed to cap 68, as by an adhesive layer 134 and extends downwardly for an extended distance into the reservoir 76 of water 78. In this manner, as the water 78 in reservoir 76 is depleted and the water surface 80 is lowered, surface 112 will remain closely adjacent water surface 80 for continued optimum humidification through wetting of surface 112 by the driven water droplets 102.

A separator 140 is placed over the entrance 142 to outlet fitting 120 so as to separate any water droplets from the humidified air passed through the outlet fitting 120 to the output conduit 40, thereby precluding the delivery of water through the output conduit 40 to the environment 20 within the terrarium 10.

Separator 140 preferably is constructed of a porous synthetic polymeric material and is affixed to cap 68, as with an adhesive at 144.

Figure 5:
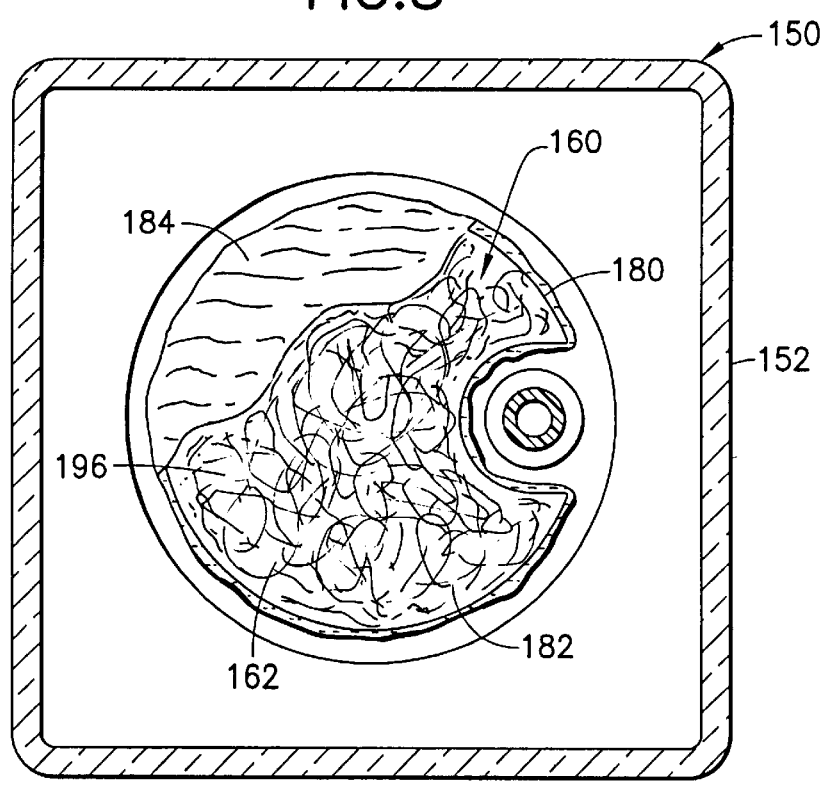
FIG. 5 is a transverse cross-sectional view taken along line 5—5 of FIG. 4.
Figure 4:
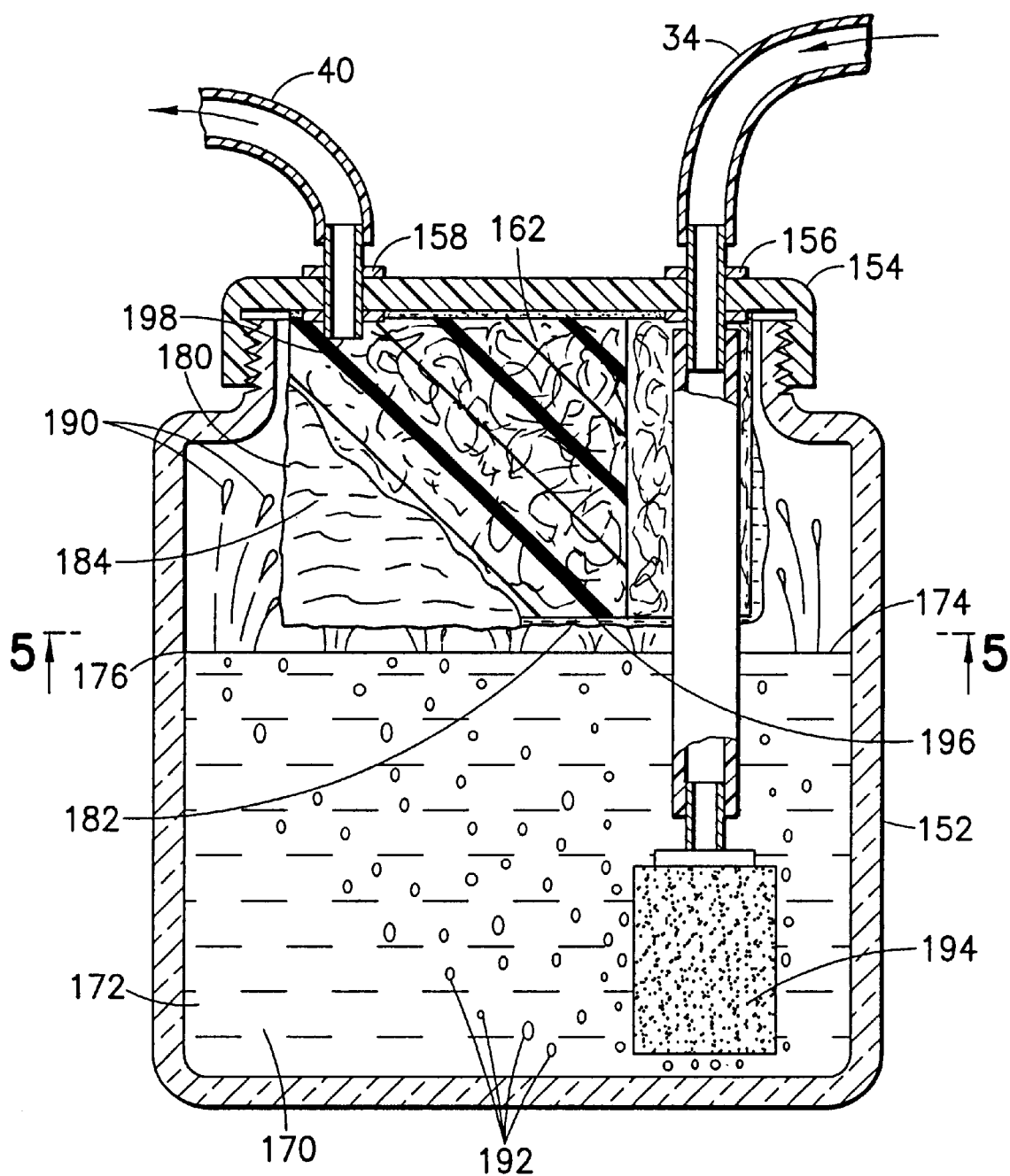
FIG. 4 is an altitudinal cross-sectional view similar to FIG. 2, and showing another embodiment of the apparatus.

Referring now to FIGS. 4 and 5, an alternate embodiment is seen to include a humidifying unit 150 having a container 152, a cap 154 coupled to the container 152, and inlet and outlet fittings 156 and 158 for connection to the input and output conduits 34 and 40, respectively, in a manner similar to that described above in connection with humidifying unit 30. However, humidifying unit 150 includes a humidifying member 160 in the form of a block 162 of reticulated foam synthetic polymeric material affixed to the cap 154 and having a length shorter than the length of corresponding block 130, so that humidifying member 160 is not necessarily immersed in the water 170 within reservoir 172 in container 152. Instead, block 162 terminates adjacent water 170 in close proximity to the water surface 174 at water level 176, and presents a side humidifying surface 180 and a distal humidifying surface 182 proximate to the water surface 174 for being wetted with water 184 by water droplets 190 driven by air bubbles 192 emanating from a diffuser 194 and bursting through water surface 174. Both humidifying surfaces 180 and 182 have a reticulated configuration providing extended surface areas for enhancing humidification, as described above. The illustrated arrangement is effective where smaller volumes of humidified air are delivered to a particular terrarium requiring only such smaller volumes.

In the present embodiment, the humidifying member 160 is provided with an extended transverse cross-sectional area 196 and is seen to extend over the entrance 198 to the outlet fitting 158 so that the reticulated material of humidifying member 160 itself serves as a separator for separating any water droplets from the humidified air delivered through the output conduit 40.

It will be seen that the present invention attains the several objects and advantages summarized above, namely: Provides apparatus and method for the effective supply of humidified air to a terrarium, with increased simplicity and effectiveness; enables the continuous provision of fresh, appropriately humidified air to a terrarium; allows increased ease of installation and operation in maintaining optimum humidity in a terrarium; provides quiet and dependable apparatus and method for assuring a supply of fresh, appropriately humidified air for terrariums; provides a relatively simple and inexpensive apparatus, capable of economical manufacture and use, for supplying humidified air to a terrarium; provides a rugged apparatus constructed of relatively few, easily crafted component parts capable of exemplary performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. Apparatus for providing humidified air to a terrarium, the apparatus comprising:

a container having a chamber for containing a reservoir of water having a water surface placed at a water level within the chamber, and an air space in the chamber above the water level;

an air inlet located below the level of the water surface;

an inlet conduit for conducting air to the air inlet so as to release air into the reservoir of water below the water level of the water surface and allow the released air to pass through the reservoir of water and burst through the water surface into the air space in the chamber;

a humidifying member extending within the air space in the chamber, adjacent the water level of the water surface, the humidifying member having a humidifying surface exposed for being wetted by water driven from the reservoir and into the air space by the air bursting through the water surface;

an air outlet communicating with the air space, above the water level of the water surface, for receiving air passed through the reservoir and humidified by water on the humidifying surface wetted by the water driven from the reservoir; and an outlet conduit communicating with the air outlet for conducting humidified air from the air outlet to the terrarium.

2. The apparatus of claim 1 wherein the air inlet comprises a diffuser for diffusing the air released into the reservoir such that the released air is released in the form of a multiplicity of air bubbles which, upon bursting through the water surface, form a spray for depositing water upon the humidifying surface of the humidifying member.

3. The apparatus of claim 2 wherein the humidifying surface of the humidifying member comprises a reticulated configuration providing the humidifying surface with an extended surface area.

4. The apparatus of claim 1 wherein the container includes an upper top and a lower bottom, and the humidifying member extends from the upper top toward the lower bottom.

5. The apparatus of claim 4 wherein the humidifying member is constructed of a reticulated foam synthetic polymeric material, and the humidifying surface of the humidifying member comprises a reticulated configuration providing the humidifying surface with an extended surface area.

6. The apparatus of claim 5 wherein the reticulated foam synthetic polymeric material includes about twenty to twenty-five pores per inch.

7. The apparatus of claim 4 wherein the humidifying member extends below the water level within the chamber and into the reservoir of water such that as water is depleted from the reservoir, humidifying surface within the air space remains adjacent the water level for being wetted by the water driven from the reservoir and into the air space by the air bursting through the water surface.

8. The apparatus of claim 1 including an inlet airflow valve communicating with the inlet conduit for regulating the volume of air conducted to the chamber.

9. The apparatus of claim 1 wherein the humidifying surface of the humidifying member comprises a reticulated configuration providing the humidifying surface with an extended surface area.

10. The apparatus of claim 9 wherein the humidifying member is constructed of a reticulated foam synthetic polymeric material.

11. The apparatus of claim 10 wherein the reticulated foam synthetic polymeric material includes about twenty to twenty-five pores per inch.

12. The apparatus of claim 1 including a separator at the air outlet for separating water from the humidified air conducted to the outlet conduit.

13. A method for providing humidified air to a terrarium, the method comprising:

providing a chamber for containing a reservoir of water having a water surface placed at a water level within the chamber, and an air space in the chamber above the water level;

conducting air to the reservoir of water so as to release air into the reservoir below the water level of the water surface and allow the released air to pass through the reservoir of water and burst through the water surface into the air space in the chamber, thereby driving water from the reservoir into the air space;

providing a humidifying surface within the air space in the chamber, adjacent the water level of the water surface, and wetting the humidifying surface with water driven from the reservoir and into the air space by the air bursting through the water surface;

exposing the air passed through the reservoir and into the air space to the wetted humidifying surface so as to be humidified by water on the humidifying surface wetted by the water driven from the reservoir; and conducting humidified air from the air space to the terrarium.

14. The method of claim 13 including diffusing the air released into the reservoir such that the released air is released in the form of a multiplicity of air bubbles which, upon bursting through the water surface, form a spray for depositing water upon the humidifying surface.

15. The method of claim 13 including regulating the volume of air conducted to the chamber.

16. The method of claim 13 including separating water from the humidified air conducted from the air space.

17. The method of claim 13 including providing the humidifying surface with a reticulated configuration for establishing an extended surface area on the humidifying surface.

18. The method of claim 17 wherein the reticulated configuration includes about twenty to twenty-five pores per inch.

* * * * *